(12) United States Patent
Doherty et al.

(10) Patent No.: US 11,775,334 B1
(45) Date of Patent: Oct. 3, 2023

(54) PROVISIONING AND MANAGING DATA ORCHESTRATION PLATFORMS IN A CLOUD COMPUTING ENVIRONMENT

(71) Applicant: FMR LLC, Boston, MA (US)

(72) Inventors: Terence Doherty, Walpole, MA (US); Saurabh Singh, Dublin (IE); Aniruththan Somu Duraisamy, Tiruchirappalli (IN); Digvijay Narayan Singh, Wake Forest, NC (US); Avinash Mysore Geethananda, Alpharetta, GA (US); Aravind Ganesan, Mookanankurichi (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/095,316

(22) Filed: Jan. 10, 2023

(51) Int. Cl.
| | |
|---|---|
| G06F 9/455 | (2018.01) |
| G06F 8/60 | (2018.01) |
| H04L 41/5054 | (2022.01) |
| H04L 41/0806 | (2022.01) |
| H04L 41/50 | (2022.01) |
| G06F 8/71 | (2018.01) |
| G06F 8/70 | (2018.01) |
| G06F 9/50 | (2006.01) |

(52) U.S. Cl.
CPC ........... *G06F 9/45558* (2013.01); *G06F 8/60* (2013.01); *G06F 9/5027* (2013.01); *H04L 41/0806* (2013.01); *H04L 41/5054* (2013.01); *G06F 8/70* (2013.01); *G06F 8/71* (2013.01); *G06F 2009/4557* (2013.01); *H04L 41/50* (2013.01)

(58) Field of Classification Search
None
See application file for complete search history.

(56) References Cited

U.S. PATENT DOCUMENTS

| | | | |
|---|---|---|---|
| 9,021,046 | B2 | 4/2015 | Mayo et al. |
| 10,554,750 | B2 | 2/2020 | Vasyutynskyy |
| (Continued) | | | |

OTHER PUBLICATIONS

Bhattacharjee et al.,"CloudCAMP: Automating the Deployment and Management of Cloud Services", 2018, IEEE, pp. 237-240. (Year: 2018).*

(Continued)

*Primary Examiner* — Qing Yuan Wu
(74) *Attorney, Agent, or Firm* — Cesari & McKenna, LLP

(57) ABSTRACT

Methods and apparatuses are described for provisioning and managing data orchestration platforms in a cloud computing environment. A server provisions in a first region a first data orchestration platform comprising (i) a first data transformation instance, (ii) first endpoints, and (iii) a first data integration instance. The server provisions in a second region a second data orchestration platform comprising (i) a second data transformation instance, (ii) second endpoints, and (iii) a second data integration instance. The server integrates the first data integration instance and the second data integration instance with an identity authentication service. The server monitors operational status of the first orchestration platform and the second orchestration platform using a monitoring service. The server refreshes virtual computing resources in each of the first orchestration platform and the second orchestration platform using a rehydration service.

26 Claims, 4 Drawing Sheets

(56) References Cited

U.S. PATENT DOCUMENTS

| | | |
|---|---|---|
| 11,178,252 B1 | 11/2021 | Devta et al. |
| 11,263,005 B2 | 3/2022 | Kunjuramanpillai et al. |
| 11,343,142 B1 | 5/2022 | Wang et al. |
| 11,392,366 B1 | 7/2022 | Wiegley |
| 2021/0049035 A1 | 2/2021 | Beyer et al. |

OTHER PUBLICATIONS

S. Madanala, "Integrating Oracle Database with Microsoft Active Directory for Centrally Managed Users," blog post on Tangenz.com, Oct. 7, 2020, available at https://tangenz.com/applying-oracle-database-with-microsoft-active-directory/, 4 pages.

"Overview of Oracle Applications and solutions on Azure," available at https://docs.microsoft.com/en-us/azure/virtual-machines/workloads/oracle/oracle-overview, Aug. 24, 2021, 4 pages.

\* cited by examiner

PROVISIONING AND MANAGING DATA ORCHESTRATION PLATFORMS IN A CLOUD COMPUTING ENVIRONMENT

TECHNICAL FIELD

This application relates generally to methods and apparatuses, including computer program products, for provisioning and managing data orchestration platforms in a cloud computing environment.

BACKGROUND

Significant advances in computing and network technology over the last decade have contributed to the rise of cloud computing services and platforms. These cloud computing services enable enterprises to deploy and host their computing systems, applications, and related services (e.g., web servers, database servers, application servers) in a remote, shared, and often virtualized computing environment that does not need to be actively managed by the enterprise. Enterprises can thus take advantage of the immense computing power, memory storage, network bandwidth, and other highly-scalable resources provided by such cloud computing services to provide a more flexible and efficient computing infrastructure for its employees and customers.

As a result, many enterprises have sought to automate deployment of key data processing applications and services—such as data orchestration platforms like Azure Cloud Factory™ from Microsoft Corp.—to cloud environments. This endeavor has led to some technical challenges and obstacles. In one example, an enterprise may utilize application- or organization-specific data processing pipelines that it wants to deploy in a cloud computing environment. Often, there are no tools available in the cloud computing platform to accomplish deployment and management of the database in an automated manner—for example, the cloud platform may not support deployment of the pipelines or supporting infrastructure (e.g., endpoints, linked services) without appropriate owner or user approval. Therefore, manual, time-intensive and resource-intensive steps must be taken to both complete the initial provisioning and deployment, along with manual approval for managed private endpoints, and to undertake ongoing maintenance and monitoring of the data orchestration platform—which can lead to delays, errors, and lack of repeatability for such actions. In addition, the cloud computing platform may not have the out-of-the-box capability to integrate with other existing, on-premise enterprise systems (e.g., authentication, data security, application and network monitoring). Finally, depending upon the requirements of the locally-hosted computing systems, the cloud computing services may not be able to provide a level of service to meet service level agreement (SLA) requirements—for example, some systems may need resiliency options such as high-availability (HA) and failover/switchover protocols.

SUMMARY

Therefore, what is needed are methods and systems for deploying, provisioning, and managing cloud-based data orchestration platforms automatically, overcoming the lack of existing tools to accomplish such tasks. The techniques described herein advantageously enable a framework of provisioning, managing, monitoring, and rehydrating data orchestration platforms and their associated virtual computing resources through centralized automation processes, integration and onboarding of such cloud computing resources to an identity authentication service, and allowing for resiliency, failover, and site swapping to deliver seamless and uninterrupted availability of critical data processing resources. In addition, the systems and methods herein provide an automation framework for deploying resources and/or code within, e.g., data orchestration platform pipelines—such as Extract Transform Load (ETL) pipelines.

The invention, in one aspect, features a system for provisioning and managing data orchestration platforms in a cloud computing environment. The system includes a server computing device having a memory for storing computer-executable instructions and a processor that executes the computer-executable instructions. The server computing device provisions a first data orchestration platform in a first region of the cloud computing environment, the first data orchestration platform comprising a plurality of virtual computing resources including (i) a first data transformation instance with one or more data pipelines, (ii) one or more first endpoints, and (iii) a first data integration instance comprising a plurality of virtual machines each connected to one or more database instances. The server computing device provisions a second data orchestration platform in a second region of the cloud computing environment, the second data orchestration platform comprising a plurality of virtual computing resources including (i) a second data transformation instance with one or more data pipelines, (ii) one or more second endpoints, and (iii) a second data integration instance comprising a plurality of virtual machines each connected to one or more database instances. The server computing device integrates the first data integration instance and the second data integration instance with an identity authentication service provided by a first computing resource of the server computing device. The server computing device monitors operational status of each of the first data orchestration platform and the second data orchestration platform using a monitoring service provided by a second computing resource of the server computing device. The server computing device refreshes one or more virtual computing resources in each of the first data orchestration platform and the second data orchestration platform using a rehydration service provided by a third computing resource of the server computing device.

The invention, in another aspect, features a computerized method of provisioning and managing data orchestration platforms in a cloud computing environment. A server computing device provisions a first data orchestration platform in a first region of the cloud computing environment, the first data orchestration platform comprising a plurality of virtual computing resources including (i) a first data integration instance comprising a plurality of virtual machines each connected to one or more database instances, (ii) one or more first endpoints, and (iii) a first data transformation instance with one or more data pipelines. The server computing device provisions a second data orchestration platform in a second region of the cloud computing environment, the second data orchestration platform comprising a plurality of virtual computing resources including (i) a second data integration instance comprising a plurality of virtual machines each connected to one or more database instances, (ii) one or more second endpoints, and (iii) a second data transformation instance with one or more data pipelines. The server computing device integrates the first data integration instance and the second data integration instance with an identity authentication service provided by a first computing resource of the server computing device. The server computing device monitors operational status of each of the first data orchestration platform and the second data orchestration platform using a monitoring service provided by a second computing resource of the server computing device. The server computing device refreshes one or more virtual computing resources in each of the first data orchestration platform and the second data orchestration platform using a rehydration service provided by a third computing resource of the server computing device.

Any of the above aspects can include one or more of the following features. In some embodiments, the first data transformation instance includes one or more triggers that automatically execute one or more of the data pipelines according to a schedule. In some embodiments, the second data transformation instance includes one or more triggers that automatically execute one or more of the data pipelines according to a schedule.

In some embodiments, the one or more database instances comprise at least one on-premises database remote from the cloud computing environment. In some embodiments, the first data transformation instance is coupled to the first data integration instance via one or more linked services. In some embodiments, the second data transformation instance is coupled to the second data integration instance via one or more linked services.

In some embodiments, integrating first data integration instance and the second data integration service with an identity authentication service comprises establishing a connection between each of the first data integration instance and the second data integration instance and the first computing resource of the server computing device, and coupling the first data integration instance and the second data integration instance to the identity authentication service such that authentication of requests to access the data orchestration platforms is performed by the identity authentication service. In some embodiments, the server computing device communicatively couples the first data integration instance to the second data integration instance for coordination of authentication between the data integration services.

In some embodiments, monitoring operational status of the first data orchestration platform using the monitoring service comprises determining that a virtual computing resource in the first data orchestration platform has failed, disabling the one or more data pipelines in the first data orchestration platform, cloning the first data orchestration platform in a new region of the cloud computing environment, enabling the one or more data pipelines of the cloned data orchestration platform, and connecting one or more database instances to the cloned data orchestration platform. In some embodiments, the monitoring service generates one or more log files associated with the operational status of the first data orchestration platform.

In some embodiments, the server computing device automatically approves the one or more endpoints of the first data orchestration platform upon provisioning of the first data orchestration platform. In some embodiments, periodically refreshing virtual computing resources in the first data orchestration platform using the rehydration service comprises detaching the first data integration instance from the first data transformation instance, deleting one or more virtual computing resources in the first data transformation instance, provisioning one or more new virtual computing resources in the first data transformation instance using updated resource templates, including rebuilding one or more data pipelines in the first data transformation instance, registering the first data integration instance to the updated first data transformation instance. In some embodiments, the updated resource templates comprise an operating system image file or a security patch image file.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
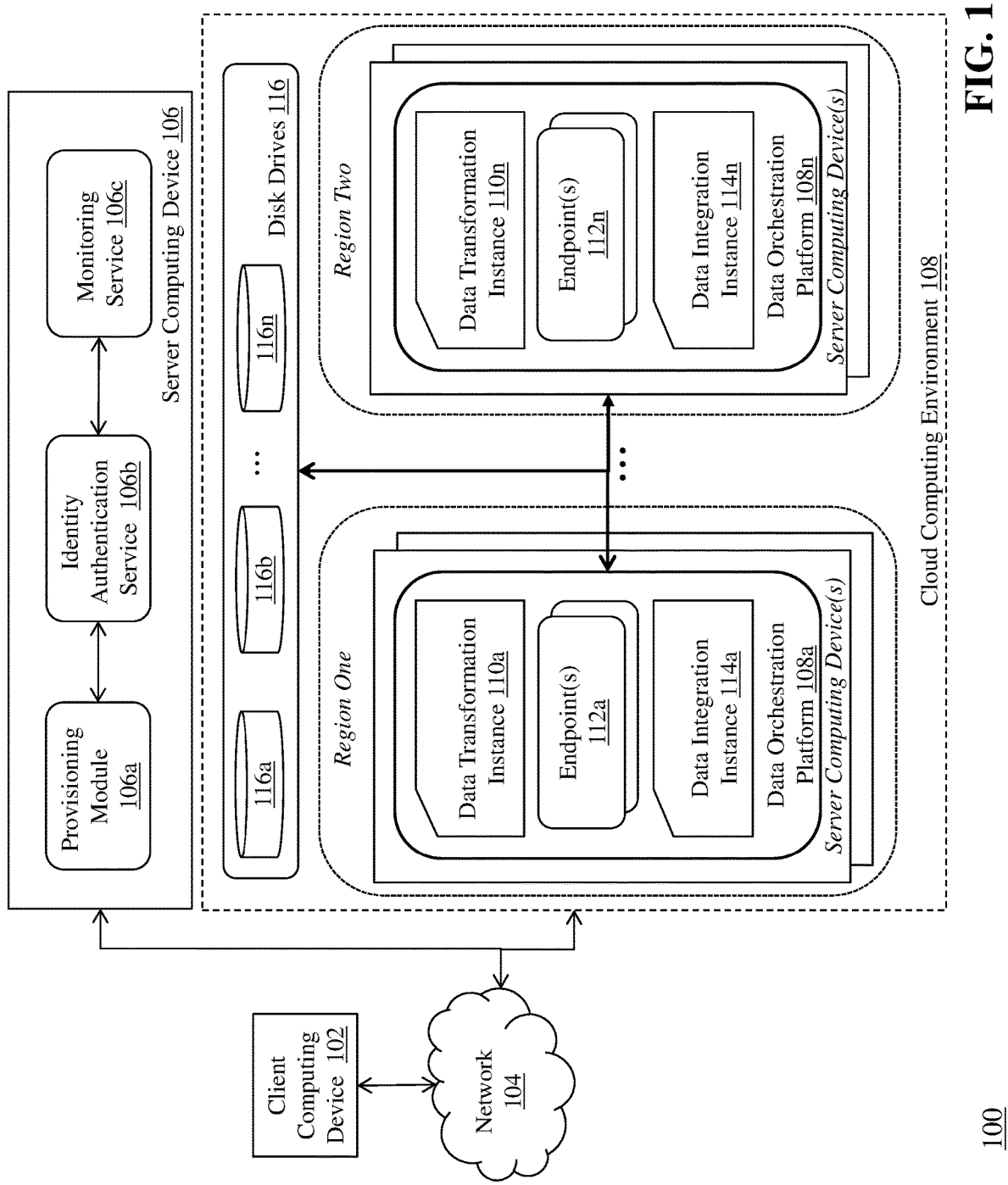
FIG. 1 is a block diagram of a system for provisioning and managing data orchestration platforms in a cloud computing environment.

FIG. 1 is a block diagram of system 100 for provisioning and managing data orchestration platforms in a cloud computing environment. System 100 includes client computing device 102 that is coupled via communications network 104 to server computing device 106 and cloud computing environment 108. Server computing device 106 includes a provisioning module 106a, an identity authentication service 106b, and a monitoring service 106c. Cloud computing environment 108 includes a plurality of data orchestration platforms 108a-108n executing on one or more server computing devices in the cloud computing environment 108. Each data orchestration platforms 108a-108n includes a data transformation instance 110a, one or more endpoints 112a-112n, and a data integration instance 114a-114n. Cloud computing environment 108 further includes one or more physical disk drives 116a-116n (collectively, 116).

Client computing device 102 connects to communications network 104 in order to communicate with server computing device 106 and cloud computing environment 108 to provide input and receive output relating to the process of provisioning and managing data orchestration platforms in a cloud computing environment as described herein. Client computing device 102 can be coupled to a display device (not shown). For example, client computing device 102 can provide a detailed graphical user interface (GUI) via the display device that presents output resulting from the methods and systems described herein, where the GUI is utilized by an operator to review and monitor data orchestration platform status information provided by server computing device 102 and/or cloud computing environment 108.

Exemplary client devices 102 include but are not limited to desktop computers, laptop computers, tablets, mobile devices, smartphones, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client devices.

Communication network 104 enables the other components of system 100 to communicate with each other in order to perform the process of provisioning and managing data orchestration platforms in a cloud computing environment as described herein. Network 104 may be a local network, such as a LAN, or a wide area network, such as the Internet and/or a cellular network. In some embodiments, network 104 is comprised of several discrete networks and/or sub-networks (e.g., cellular to Internet) that enable the components of the system 100 to communicate with each other.

Server computing device 106 is a combination of hardware, including one or more special-purpose processors and one or more physical memory modules, and specialized software modules—such as modules 106a-106c—that are executed by a processor of server computing device 106, to receive data from other components of system 100, transmit data to other components of system 100, and perform functions for provisioning and managing data orchestration platforms in a cloud computing environment as described herein. In some embodiments, modules 106a-106c are specialized sets of computer software instructions programmed onto a dedicated processor in server computing device 106 and can include specifically-designated memory locations and/or registers for executing the specialized computer software instructions. Further explanation of the specific processing performed by modules 106a-106c will be provided below.

Cloud computing environment 108 is a combination of hardware, including one or more special-purpose processors and one or more physical memory modules, and specialized software—such as data orchestration platforms 108a-108n—that are executed by processor(s) of one or more server computing devices in cloud computing environment 108, to receive data from other components of system 100, transmit data to other components of system 100, and perform functions for provisioning and managing data orchestration platforms in a cloud computing environment as described herein. Data orchestration platforms 108a-108n each comprises a data transformation instance (DTI) 110a-110n, one or more endpoints 112a-112n, and a data integration instance (DII) 114a-114n. In some embodiments, elements 110a-110n, 112a-112n, and 114a-114n of data orchestration platforms 108a-108n comprise virtual computing resources, e.g., software modules such as a container that includes a plurality of files and configuration information (i.e., software code, environment variables, libraries, other dependencies, and the like) and one or more database instances (i.e., data files and/or a local database). Cloud computing environment 108 can be configured to execute many instances of data orchestration platform 108a-108n, isolation from each other, that access a single operating system (OS) kernel. In some embodiments, cloud computing environment 108 executes each data orchestration platform 108a-108n and/or the platform's component resources 110a-110n, 112a-112n, and 114a-114n in a separate OS process, and constrains each platform's and/or resource's access to physical resources (e.g., CPU, memory) of the corresponding server computing device so that a single data orchestration platform 108a-108n does not utilize all of the available physical resources. Upon execution, one or more server computing devices in cloud computing environment 108 executes application code and data stored in data orchestration platforms 108a-108n for delivery, configuration, monitoring, presentation, and/or manipulation of the data contained in, e.g., data orchestration platforms 108a-108n. In one embodiment, cloud computing environment 108 is deployed using a commercially-available cloud computing platform. As shown in FIG. 1, the resources of cloud computing environment 108 can be distributed into a plurality of regions which can be defined according to certain geographic and/or technical performance requirements. Each region can comprise one or more datacenters connected via a regional network that meets specific low-latency requirements. Inside each region, cloud computing environment 108 can be partitioned into one or more availability zones (AZ), which are physically separate locations used to achieve tolerance to, e.g., hardware failures, software failures, disruption in connectivity, unexpected events/disasters, and the like. Typically, the availability zones are connected using a high-performance network (e.g., round trip latency of less than 2 milliseconds). It should be appreciated that other types of computing resource distribution and configuration in a cloud environment can be used within the scope of the technology described herein.

Cloud computing environment 108 also comprises a plurality of disk drives 116a-116n that are coupled to the database instances 110a-110b of the virtual computing resources 108a-108b. Disk drives 116a-116n comprise physical disk drives (e.g., hard disk drives (HDD) and/or solid-state drives (SSD)) that are used by data orchestration platforms 108a-108n to store data elements associated with data transformation instances 110a-110n, endpoints 112a-112n, and/or data integration instances 114a-114n. In the example of a cloud computing environment, these disk drives 116a-116n can be managed/shared disks used by a plurality of different resources or computing devices. Typically, a data orchestration platform 108a-108n is attached to a particular disk drive 116a when initialized and is detached from the disk drive when the data orchestration platform 108a-108n is removed, updated, re-initialized, or rehydrated.

Figure 2:
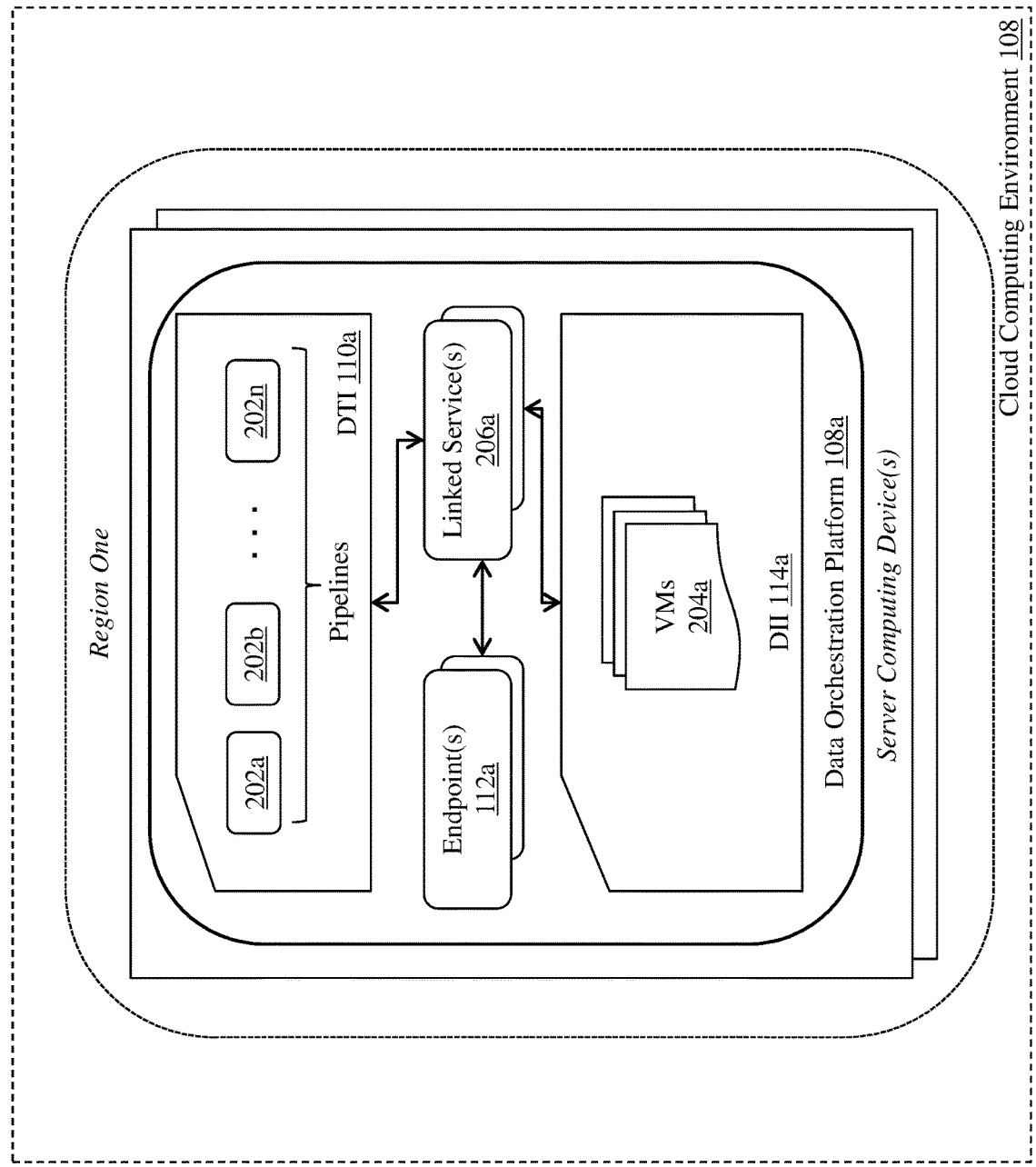
FIG. 2 is a detailed block diagram of a data orchestration platform.

FIG. 2 is a detailed block diagram of data orchestration platform 108a of FIG. 1. It should be appreciated that other data orchestration platforms (e.g., 108n) comprise the same elements as platform 108a shown in FIG. 2. Data orchestration platform 108a comprises data transformation instance 110a, which includes a plurality of pipelines 202a-202n. Generally, pipelines 202a-202n each comprise a logical grouping of data processing steps (e.g., data movement, data transformation, data control) that perform a unit of work or task. For example, a pipeline can ingest or copy data from a first source then execute a query to partition the data. It should be appreciated that pipelines 202a-202n enable management of processing steps as a set instead of individually, as the processing steps in a pipeline can be connected to operate in a defined sequence or operate in parallel. Data transformation instance 110a also includes one or more triggers that automatically execute data processing steps in one or more of the pipelines according to a schedule. Generally, a trigger defines conditions (e.g., start date, time, recurrence) relating to the automatic periodic execution of data processing steps contained in one or more pipelines without external intervention. Data transformation instance 110a is configured to automatically execute a corresponding pipeline when the trigger conditions are met.

Endpoints (e.g., 112a) are network interfaces to storage resources and other services (e.g., SaaS, PaaS) in cloud computing environment 108 and/or made available by on-premise computing resources such as server computing device 106. Generally, an endpoint 112a enables data transformation instance 110a and data integration instance 114a to securely communicate with, e.g., disk drives 116 of cloud environment 108, modules 106a-106c of server computing device 106, and/or other virtual or on-premise computing resources (e.g., storage resources) configured in cloud computing environment 108 or in one or more other computing environments. In some instances, each endpoint 112a is configured to use a private IP address from a virtual network of cloud computing environment 108 to integrate a storage resource and/or service into the cloud environment.

Linked services 206a enable data orchestration platform 108 to connect to external services and resources. In some embodiments, each linked service 206a defines connection information used by platform 108 to connect to a data store or computing resource (e.g., databases, file systems, SaaS, APIs) including but not limited to disk drives 116, and also includes a dataset that represents a structure of the data in the linked data source. Typically, a linked service 206a stores a connection string and other types of information used to connect to the data store/computing resource, such as authentication information. The data store or computing resource/service referenced by linked service 206a can be a source of data to be retrieved by platform 108, or a target for data to be stored by platform 108.

Data integration instance 114a comprises one or more virtual machines (VMs) 204a. In some embodiments, data integration instance 114a can comprise a runtime that acts as a conduit between one or more of the processing steps/tasks defined in pipelines 202a-202n in DTI 110a and one or more of the linked services 206a. For example, data integration instance 114 can be referenced by one or more linked services 206a and/or pipeline processing steps and provides a computing environment (e.g., virtual machines 204a) where the pipeline processing step is executed or initiated from. As a result, data orchestration platform 108a can perform the pipeline processing step in a region of the cloud environment 108 that is physically or logically closest to the data store/computing resource indicated in the linked service 206a, which provides performance improvements while also ensuring that the data connection is secure. In some embodiments, virtual machines 204a can be coupled to data objects (e.g., blobs) that are located within data integration instance 114a for use in performing desired data processing functions.

As can be appreciated, system 100 of FIG. 1 can advantageously implement a number of automated workflows and processes to provision and manage data orchestration platforms 108a-108n in a cloud computing environment 108, instead of relying on manually-invoked jobs and user-based monitoring and intervention to dynamically allocate the computing resources, infrastructure, and security requirements needed to instantiate data orchestration platforms 108a-108n within the cloud environment.

Figure 3:
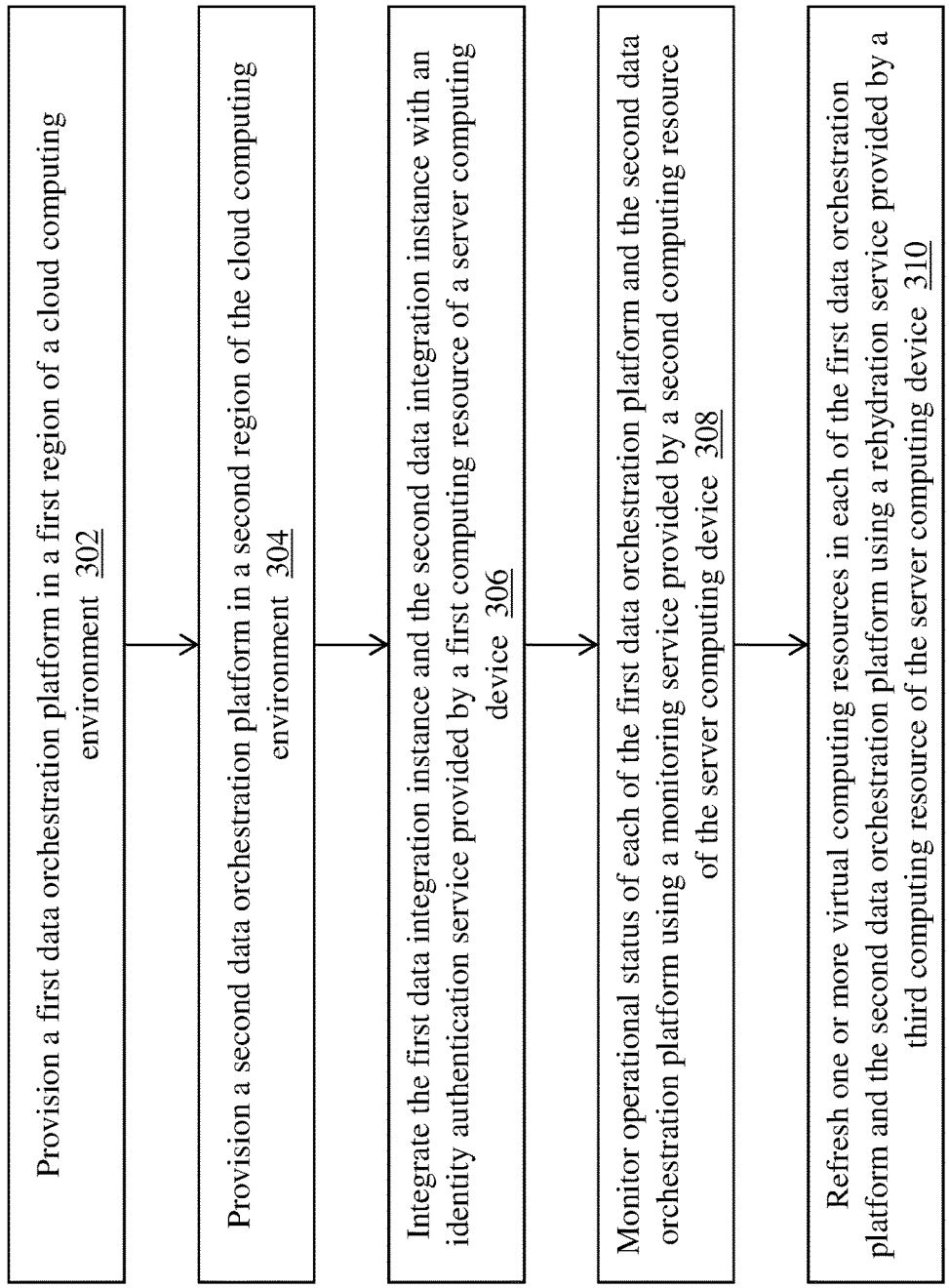
FIG. 3 is a flow diagram of a computerized method of provisioning and managing data orchestration platforms in a cloud computing environment.

FIG. 3 is a flow diagram of a computerized method 300 of provisioning and managing data orchestration platforms in a cloud computing environment, using system 100 of FIG. 1. Provisioning module 106a of server computing device 106 provisions (step 302) a first data orchestration platform (e.g., platform 108a) in a first region (e.g., Region One) of cloud computing environment 108. In one embodiment, a user at client computing device 102 establishes a connection via network 104 to provisioning module 106a, which determines a role of the user at client computing device 102 (e.g., using authentication credentials and/or a user profile provided by the client computing device) and enables user access to provisioning and deployment software features (e.g., code files, binaries, libraries, etc.) that, when executed, configure the provisioned data orchestration platform 108a in the cloud environment 108. For example, the user at client computing device 102 can use DevOps automation tools such as Jenkins™ (available at www.jenkins.io) and/or UrbanCode Deploy™ (uDeploy) (available at www.urbancode.com/product/deploy) to build, test, and execute a code base that deploys data orchestration platform 108a to the cloud environment 108. Once the code base to be executed is identified, provisioning module 106a establishes a communication session with one or more server computing devices in the cloud environment 108, determines a region (i.e., Region One) in which to provision data orchestration platform 108a, and provisions data orchestration platform 108a in the cloud environment 108.

In some embodiments, the code base includes one or more templates which enable the provisioning of data orchestration platform 108a and automatic deployment of multiple objects, services, instances (and their dependencies)—i.e., DTA 110a, endpoint(s) 112a, and DII 114a—for data orchestration platform 108a. The template(s) can be used each time a specific data orchestration platform is deployed in the cloud environment 108. The template(s) can be preconfigured in the cloud environment 108 to provide specific computing resources, memory allocations, deployment instructions, configuration settings, and so forth. In some embodiments, provisioning module 106a can provision data orchestration platform 108a using the template(s) in conjunction with one or more application images retrieved from, e.g., a local or remote image repository. In some embodiments, the code base used to deploy data orchestration platform 108a is part of a continuous integration/continuous delivery (CI/CD) process, in which changes, updates, and improvements are continuously made to the code base—which can be frequently executed to re-configure and enhance the deployed data orchestration platform 108a in the cloud environment 108. As mentioned above, deployment of data orchestration platform 108a includes the provisioning of the underlying elements in platform 108a—such as data transformation instance 110a (including pipelines 202a-202n), endpoint(s) 112a, linked service(s) 206a, and data integration instance 114a with corresponding VMs 204a.

In some embodiments, provisioning module 106a is configured to automatically approve one or more endpoints 112a of data orchestration platform 108a during provisioning. Generally, when an endpoint 112a is provisioned in platform 108a, provisioning module 106a sends a request for approval to the system and/or owner of the resource referenced by the endpoint. In certain instances, when the owner of the resource is the same as the creator of the endpoint, the request for approval can be automatically approved. Advantageously, provisioning module 106a can be configured to automatically approve such requests for approval when instantiating data orchestration platform 108a—thereby reducing the amount of manual intervention required to provision a data orchestration platform 108a.

Sequentially or concurrently with the provisioning of data orchestration platform 108a, provisioning module 106a of server computing device 106 provisions (step 304) a second data orchestration platform (e.g., platform 108n) in a second region (e.g., Region Two) of cloud computing environment 108. It should be appreciated that provisioning module 106a can deploy the second data orchestration platform 108n using a same code base and/or template(s) used to deploy the first data orchestration platform 108a—and simply designate deployment to a different region of cloud environment 108. In some embodiments, second data orchestration platform 108n can be configured as a replica of first data orchestration platform 108a in order to provide failover and fault tolerance in the event of a failure in first platform 108a—e.g., if a resource of first platform 108a fails or is otherwise experiencing technical issues, system 100 can route data requests to second platform 108n to ensure uninterrupted service for end users.

In some embodiments, once the first data orchestration platform 108a and second data orchestration platform 108n are provisioned, provisioning module 106a connects one or more VMs 204a in data integration instance 114a to one or more database instances (e.g., disk drives 116). In some embodiments, provisioning module 106a can create a virtualized database instance in DII 114a that is coupled to one or more VMs 204a and the virtualized database instance can connect to one or more external data resources (including but not limited to disk drives 116). In some embodiments, provisioning module 106a connects to each of the VMs 204a and creates a database instance using, e.g., a database image retrieved from a local or remote image repository. For example, provisioning module 106a can retrieve a database image and deploy the database image into a VM. The database image can be a default database image used in the cloud environment 108 or a customized database image (either newly created for use in the cloud environment 108, uploaded from the server computing device 106, or selected from a network repository). In one example, the database image can be a database-specific Linux™ image that corresponds to a particular database version. In another example, the database image can be a non-database specific Linux image and/or a custom image.

As part of creating the database instances, provisioning module 106a attaches one or more storage disks (e.g., disk drives 116) to each of the database instances for use as physical storage locations for the database instances. During database instance creation, provisioning module 106a can connect to the disk drives 116, determine characteristics like storage capacity, latency, bandwidth, availability, and the like for each disk drive, and select one or more disk drives/locations to attach to each database instance.

Continuing with FIG. 3, provisioning module 106a integrates (step 306) the first data orchestration platform 108a and the second data orchestration platform 108n in the cloud environment 108 with identity authentication service 106b of server computing device 106. For example, in some infrastructures, server computing device 106 can maintain an on-premises user access management module such as identity authentication service 106b. In order to ensure seamlessness and uniformity of access control from on-premises to cloud, it is desirable to synchronize user accounts between the local identity authentication service 106b and the cloud environment 108. This also enables users to access data orchestration platforms 108a-108n according to the specific permissions/roles assigned to them in the on-premises system. In some embodiments, identity authentication service 106b is configured to connect to the cloud environment 108 and establish a link relationship between a user of the identity authentication service 106b and a corresponding cloud representation of the user (that is maintained by the cloud service provider). The configuration of the cloud environment 108 enables each of the components of data orchestration platforms 108a-108n to access the user access information when responding to requests (e.g., data read/write/update requests, application execution, etc.) that require access to data (e.g., via endpoints 112a-112n and/or disk drives 116). Then, when access changes are made to the users in identity authentication service 106b, those changes are synchronized automatically to the cloud environment 108.

In some embodiments, provisioning module 106a also configures first data orchestration platform 108a and second data orchestration platform 108n to synchronize infrastructure and data processing pipelines between the respective platforms. As can be appreciated, a benefit of implementing resources and services in a cloud computing environment is the ability to create redundancy and failover infrastructures so that critical enterprise data pipelines and applications do not experience any interruptions in service. During initial deployment and/or during subsequent updates, provisioning module 106a can configure data orchestration platforms 108a-108n according to any of a number of different high availability patterns so that data processing features and pipelines (e.g., 202a-202n) remain consistent and able to be accessed across different platforms and/or regions in cloud computing environment 108.

In one example, data orchestration platform 108a may experience an error or technical problem that prevents normal operation (e.g., failure of cloud hardware, connectivity issues, etc.). In such events, it is crucial to seamlessly swap from data orchestration platform 108a to another data orchestration platform 108n (also called site switching) so that system operation and availability is not affected. In some embodiments, the site switching process includes the requirement to disable one or more pipelines in a data orchestration platform that is experiencing problems and enable the corresponding pipelines in another data orchestration platform.

As can be appreciated, such high availability patterns provide several technical advantages to the overall system 100. Once a high availability pattern is set up, monitoring service 106c of system 100 monitors (step 308 of FIG. 3) each of the data orchestration platforms 108a-108n. For example, monitoring service 106c can actively track characteristics of the data orchestration platforms 108a-108n and their associated virtual computing resources (e.g., pipelines, VMs, linked services, endpoints) in the cloud computing environment 108, such as functional status, data errors, network connectivity, bandwidth, processing overhead, usage, data processing requests, online/offline status, and the like. In some embodiments, monitoring service 106c can receive one or more log files generated by data orchestration platforms 108a-108n and analyze the log files to determine the above characteristics as part of the monitoring process.

Upon detecting an undesirable or adverse condition of one or more of the data orchestration platforms 108a-108n (such as a pipeline issue or virtual computing resource failure), monitoring service 106c can redirect traffic from one data orchestration platform 108a in one region to another data orchestration platform 108n in another region in order to maintain continuity of data processing availability and system functionality. In some embodiments, monitoring service 106c can additionally transmit alert messages received from one or more of data orchestration platforms 108a-108n via an established connection when a failure event occurs at the one or more data orchestration platforms 108a-108n. The alert message can be transmitted to, e.g., an end user device such as client computing device 102 so that system administrators and other personnel can be informed of the service interruption. Alert messages can also be generated and transmitted by monitoring service 106c in the event that failures or errors are detected at one or more disk drives 116 and/or other system resources that are connected to cloud environment 108.

In some embodiments, monitoring service 106c can dynamically create a new data orchestration platform in the cloud environment 108 upon determining that a first data orchestration platform 108a (or a virtual computing resource therein) is failing. Monitoring service 106c disables one or more pipelines in the first data orchestration platform 108a (e.g., by pausing triggering or execution of the data pipeline by updating property "isPaused" to true in a .json pipeline configuration file). Monitoring service 106c clones the first data orchestration platform 108a in a new region of cloud computing environment 108—as described above, service 106c can call provisioning service 106a to deploy a copy of first data orchestration platform 108a in a different region (e.g., Region Two), thereby creating second data orchestration platform 108n. It should be appreciated that second platform 108n comprises pipelines in a data transformation instance 110n that comprise the same data processing functionality as the disabled pipelines in platform 108a. Monitoring service 106c enables the cloned pipelines in data orchestration platform 108n and connects one or more database instances (e.g., disk drives 116) to platform 108n (e.g., via linked services).

Figure 4:
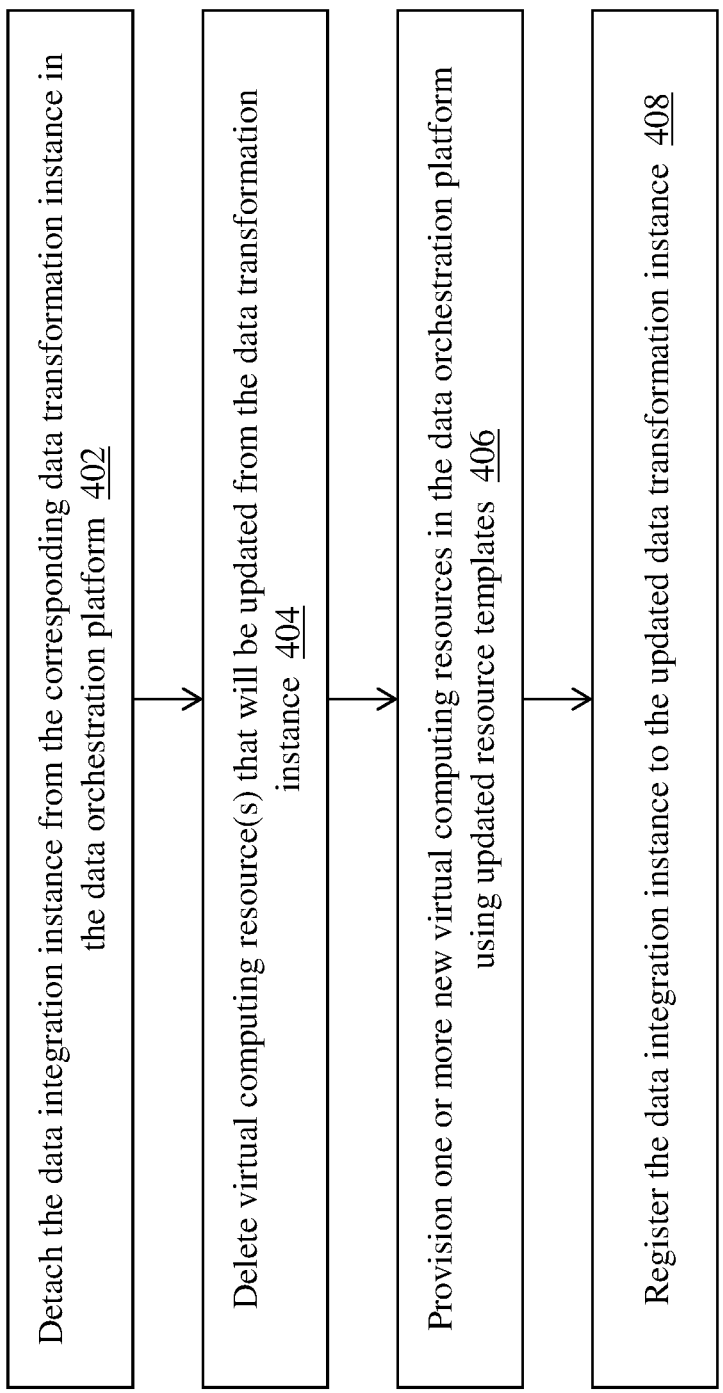
FIG. 4 is a flow diagram of a computerized method 400 of refreshing a data orchestration platform 108a-108n in the cloud computing environment 108 via rehydration.

In addition to the above features, the systems and methods described herein provide for seamless updating of data orchestration platforms 108a-108n through a process of rehydration. As can be appreciated, existing deployed data orchestration platforms 108a-108n may require periodic or emergency software image updates (e.g., when data processing pipeline updates are required, when a new software version and/or operating system version is released, when a data resource is changed, when a new security patch is released, etc.). Provisioning module 106a can be configured to initiate a rehydration process to refresh (step 310 of FIG. 3) one or more virtual computing resources in each of the first data orchestration platform 108a and second data orchestration platform 108n in the cloud environment 108. FIG. 4 is a flow diagram of a computerized method 400 of refreshing a data orchestration platform 108a-108n in the cloud computing environment 108 via rehydration. Provisioning module 106a detects that one or more of the data orchestration platforms 108a-108n and/or one or more virtual computing resources within the platforms needs to be updated. For example, when a new version of software associated with data orchestration platform 108a-108n is released, provisioning module 106c can be configured to determine that the current version of the software in data orchestration platform 108a-108n is out of date (e.g., by comparing a build number, version number, or other similar indicia). In another example, provisioning module 106c can be configured to determine that a code base associated with data orchestration platform 108a-108n has been modified (e.g., via a build instruction or other indicia from a code development management system). A common rehydration process is to update software associated with virtual machines 204a in data integration instance 114a.

To begin the rehydration process, provisioning module 106c detaches (step 402) the data integration instance 114a from the corresponding data transformation instance 110a in data orchestration platform 108a. Next, provisioning module 106c deletes (step 404) one or more virtual computing resource(s) (e.g., pipelines, linked services, endpoints, VMs) in data transformation instance 110a that will be updated via rehydration.

Provisioning module 106c then provisions (step 406) one or more new virtual computing resource(s) using updated resource templates (i.e., newer or changed templates that are different from those originally used to create the virtual computing resource(s) (e.g., pipelines, linked services, endpoints, VMs). For example, provisioning module 106c can deploy the virtual computing resource using an updated software image file (e.g., an operating system image file or a security patch image; file) that was created to deploy the new version of the software and/or virtual computing resource(s) in cloud environment 108. After the new virtual computing resource is created in data orchestration platform 108a, provisioning module 106c registers (step 408) data integration instance 114a to the updated data transformation instance 110a. In some embodiments, the rehydration process includes provisioning module 106a detaching one or more physical data resources (e.g., disk drives 116) from data transformation instance 110a and/or data orchestration platform 108a prior to beginning the rehydration. After rehydration is complete, provisioning module 106a re-attaches the physical data resources to data transformation instance 110a and/or data orchestration platform 108a.

As can be appreciated, system 100 can implement any or all of the techniques described herein using an automated, script-based approach. For example, provisioning module 106a can be configured to store one or more scripts that comprise a series of instructions to automatically carry out the required steps for the functions described in FIGS. 3 and 4. For example, a user at client computing device 102 can connect to server computing device 106 and initiate execution of one or more scripts to create data orchestration platforms and corresponding virtual computing resource infrastructure, configure the high availability patterns described herein according to specified requirements, enable the synchronization of data across regions, resources and instances, integrate the cloud computing environment with the identity authentication service, and perform rehydration of resources and/or instances in the cloud environment in order to update relevant software. In this way, the methods and systems advantageously provide for the automated provisioning and management of data orchestration platforms in a cloud computing environment to overcome the lack of existing tools to accomplish such deployment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for provisioning and managing data orchestration platforms in a cloud computing environment, the system comprising a server computing device having a memory for storing computer-executable instructions and a processor that executes the computer-executable instructions to:

provision a first data orchestration platform in a first region of the cloud computing environment, the first data orchestration platform comprising a plurality of virtual computing resources including (i) a first data integration instance comprising a first plurality of virtual machines each connected to one or more database instances, (ii) one or more first endpoints, and (iii) a first data transformation instance with one or more data pipelines;

provision a second data orchestration platform in a second region of the cloud computing environment, the second data orchestration platform comprising a plurality of virtual computing resources including (i) a second data integration instance comprising a second plurality of virtual machines each connected to one or more database instances, (ii) one or more second endpoints, and (iii) a second data transformation instance with one or more data pipelines;

integrate the first data integration instance and the second data integration instance with an identity authentication service provided by a first computing resource of the server computing device;

monitor operational status of each of the first data orchestration platform and the second data orchestration platform using a monitoring service provided by a second computing resource of the server computing device; and refresh one or more virtual computing resources in each of the first data orchestration platform and the second data orchestration platform using a rehydration service provided by a third computing resource of the server computing device.

2. The system of claim 1, wherein the first data transformation instance includes one or more triggers that automatically execute one or more of the data pipelines according to a schedule.

3. The system of claim 1, wherein the second data transformation instance includes one or more triggers that automatically execute one or more of the data pipelines according to a schedule.

4. The system of claim 1, wherein the one or more database instances comprise at least one on-premises database remote from the cloud computing environment.

5. The system of claim 1, wherein the first data transformation instance is coupled to the first data integration instance via one or more linked services.

6. The system of claim 1, wherein the second data transformation instance is coupled to the second data integration instance via one or more linked services.

7. The system of claim 1, wherein integrating first data integration instance and the second data integration service with an identity authentication service comprises:

establishing a connection between each of the first data integration instance and the second data integration instance and the first computing resource of the server computing device; and coupling the first data integration instance and the second data integration instance to the identity authentication service such that authentication of requests to access the data orchestration platforms is performed by the identity authentication service.

8. The system of claim 7, wherein the server computing device communicatively couples the first data integration instance to the second data integration instance for coordination of authentication between the data integration instances.

9. The system of claim 1, wherein monitoring operational status of the first data orchestration platform using the monitoring service comprises:

determining that a virtual computing resource in the first data orchestration platform has failed;

disabling the one or more data pipelines in the first data orchestration platform;

cloning the first data orchestration platform in a new region of the cloud computing environment;

enabling the one or more data pipelines of the cloned data orchestration platform; and connecting one or more database instances to the cloned data orchestration platform.

10. The system of claim 9, wherein the monitoring service generates one or more log files associated with the operational status of the first data orchestration platform.

11. The system of claim 1, wherein the server computing device automatically approves the one or more endpoints of the first data orchestration platform upon provisioning of the first data orchestration platform.

12. The system of claim 1, wherein periodically refreshing virtual computing resources in the first data orchestration platform using the rehydration service comprises:

detaching the first data integration instance from the first data transformation instance;

deleting one or more virtual computing resources in the first data transformation instance;

provisioning one or more new virtual computing resources in the first data transformation instance using updated resource templates, including rebuilding one or more data pipelines in the first data transformation instance; and registering the first data integration instance to the updated first data transformation instance.

13. The system of claim 12, wherein the updated resource templates comprise an operating system image file or a security patch image file.

14. A computerized method of provisioning and managing data orchestration platforms in a cloud computing environment, the method comprising:

provisioning, by a server computing device, a first data orchestration platform in a first region of the cloud computing environment, the first data orchestration platform comprising a plurality of virtual computing resources including (i) a first data integration instance comprising a first plurality of virtual machines each connected to one or more database instances, (ii) one or more first endpoints, and (iii) a first data transformation instance with one or more data pipelines;

provisioning, by the server computing device, a second data orchestration platform in a second region of the cloud computing environment, the second data orchestration platform comprising a plurality of virtual computing resources including (i) a second data integration instance comprising a second plurality of virtual machines each connected to one or more database instances, (ii) one or more second endpoints, and (iii) a second data transformation instance with one or more data pipelines;

integrating, by the server computing device, the first data integration instance and the second data integration instance with an identity authentication service provided by a first computing resource of the server computing device;

monitoring, by the server computing device, operational status of each of the first data orchestration platform and the second data orchestration platform using a monitoring service provided by a second computing resource of the server computing device; and refreshing, by the server computing device, one or more virtual computing resources in each of the first data orchestration platform and the second data orchestration platform using a rehydration service provided by a third computing resource of the server computing device.

15. The method of claim 14, wherein the first data transformation instance includes one or more triggers that automatically execute one or more of the data pipelines according to a schedule.

16. The method of claim 14, wherein the second data transformation instance includes one or more triggers that automatically execute one or more of the data pipelines according to a schedule.

17. The method of claim 14, wherein the one or more database instances comprise at least one on-premises database remote from the cloud computing environment.

18. The method of claim 14, wherein the first data transformation instance is coupled to the first data integration instance via one or more linked services.

19. The method of claim 14, wherein the second data transformation instance is coupled to the second data integration instance via one or more linked services.

20. The method of claim 14, wherein integrating first data integration instance and the second data integration service with an identity authentication service comprises:
    establishing a connection between each of the first data integration instance and the second data integration instance and the first computing resource of the server computing device; and
    coupling the first data integration instance and the second data integration instance to the identity authentication service such that authentication of requests to access the data orchestration platforms is performed by the identity authentication service.

21. The method of claim 20, wherein the server computing device communicatively couples the first data integration instance to the second data integration instance for coordination of authentication between the data integration services.

22. The method of claim 14, wherein monitoring operational status of the first data orchestration platform using the monitoring service comprises:
    determining that a virtual computing resource in the first data orchestration platform has failed;
    disabling the one or more data pipelines in the first data orchestration platform;
    cloning the first data orchestration platform in a new region of the cloud computing environment;
    enabling the one or more data pipelines of the cloned data orchestration platform; and
    connecting one or more database instances to the cloned data orchestration platform.

23. The method of claim 22, wherein the monitoring service generates one or more log files associated with the operational status of the first data orchestration platform.

24. The method of claim 14, wherein the server computing device automatically approves the one or more endpoints of the first data orchestration platform upon provisioning of the first data orchestration platform.

25. The method of claim 14, wherein periodically refreshing virtual computing resources in the first data orchestration platform using the rehydration service comprises:
    detaching the first data integration instance from the first data transformation instance;
    deleting one or more virtual computing resources in the first data transformation instance;
    provisioning one or more new virtual computing resources in the first data transformation instance using updated resource templates, including rebuilding one or more data pipelines in the first data transformation instance; and
    registering the first data integration instance to the updated first data transformation instance.

26. The method of claim 25, wherein the updated resource templates comprise an operating system image file or a security patch image file.

* * * * *